ically, the water-soluble whey protein concentrate employed in accordance with the present invention is a whey protein concentrate prepared from whey by gel filtration.

United States Patent [19]
Kuipers et al.

[11] 4,188,411
[45] Feb. 12, 1980

[54] METHOD OF PREPARING A PROTEIN-ENRICHED UNRIPENED CHEESE COMPOSITION

[75] Inventors: Arie Kuipers; Karl Schröder, both of Reitmehring, Fed. Rep. of Germany

[73] Assignee: Meggle Milchindustrie GmbH & Co. KG, Munich, Fed. Rep. of Germany

[21] Appl. No.: 652,181

[22] Filed: Jan. 26, 1976

[30] Foreign Application Priority Data

Jan. 30, 1975 [DE] Fed. Rep. of Germany ....... 2503840

[51] Int. Cl.² .................. A23C 19/02; A23C 19/12; A23C 21/00
[52] U.S. Cl. .................................... 426/582; 426/36; 426/583
[58] Field of Search .................. 426/36, 582, 583, 40, 426/38, 41; 260/122

[56] References Cited

U.S. PATENT DOCUMENTS

| | | | |
|---|---|---|---|
| 2,507,480 | 5/1950 | McDonald et al. | 426/582 |
| 3,297,451 | 1/1967 | Eggen et al. | 426/40 |
| 3,316,098 | 4/1967 | Noznick et al. | 426/40 |
| 3,583,968 | 6/1971 | Pien | 260/122 X |
| 3,644,326 | 2/1972 | Pien | 260/122 |
| 3,930,039 | 12/1975 | Kuipers | 426/583 |

*Primary Examiner*—David M. Naff
*Attorney, Agent, or Firm*—Toren, McGeady and Stanger

[57] ABSTRACT

A protein-enriched, unripened cheese composition is prepared by dispersing a water-soluble concentrate of whey protein in unripened cheese.

7 Claims, No Drawings

METHOD OF PREPARING A PROTEIN-ENRICHED UNRIPENED CHEESE COMPOSITION

This invention relates to a method of preparing an unripened cheese composition enriched with whey protein.

Four methods of preparing unripened cheese compositions enriched with whey protein were known heretofore. In one method, whey protein or whey protein concentrate is added to milk, and the protein-enriched milk so obtained is caused to curdle. The curds are separated from an aqueous liquid in which some whey protein is again lost. The increase in protein content that can be achieved by this method is inherently limited.

In the second method, milk is heated to a high temperature in the presence of calcium ions prior to coagulation so that whey protein is bound to the casein and is recovered with the casein after coagulation. This method does not permit the recovery of the entire whey protein originally present in the milk, and some whey protein is inherently lost when the curds are separated from the aqueous liquid. The heating of the milk prior to coagulation adds an additional step to the normal cheese making process and consumes energy.

According to the third method, the milk is subjected to ultrafiltration, and enough water is removed thereby to avoid the formation of a separate aqueous phase or whey after coagulation. No more whey protein can be found in the ultimate product than was initially present in the milk, and ultrafiltration of the entire milk supply is costly.

The fourth method calls for thermal precipitation of protein from the whey under conditions of time and temperature to cause denaturing of the protein which thereafter no longer is soluble. This product, when mixed with unripened cheese, gives the mixture a grainy texture and a taste significantly different from that of ordinary unripened cheese. About one third of the whey protein is not capable of being precipitated by a practical heat treatment.

It is a primary object of the invention to provide a method of making an unripened cheese product enriched with whey protein which is free from the shortcomings of the afore-described known methods. It is a more specific object to provide a method which does not require significant changes in the usual procedure of preparing unripened cheese, yet permits the whey protein content of the ultimate cheese composition to be raised to any desired value, more specifically, a whey protein content higher than that of the milk from which the casein in the composition is derived. It is a further object of the invention to produce unripened cheese of low fat content having the taste and mouth feeling of a cheese rich in fat.

With these and other objects in view, as will hereinafter become apparent, the invention proposes to make an unripened cheese composition enriched with water-soluble protein by dispersing a water-soluble concentrate of whey protein in unripened cheese, itself produced in any known manner. The term "unripened cheese" is employed herein in the conventional manner to designate curds precipitated from whole milk, skim milk, or enriched milk, but not cured or ripened. Cottage cheese, German Quarg, French Gervais and Petit Suisse are typical unripened cheeses.

The term "concentrate of whey protein" or "whey protein concentrate" is employed herein to designate a composition whose solids contain a higher percentage of whey protein than the whey obtained by conventional coagulation of milk and removal of the curds. A typical whey protein concentrate of the invention contains solids consisting of 30% to 80% whey protein, preferably ⅔ or more of the protein being present in soluble form. The soluble protein fraction is determined by centrifuging an aqueous medium containing 10% of the solids at 196 g, g being the normal value of terrestrial gravity. The soluble protein in the whey protein concentrate of the invention is predominantly in the native state, that is, not denatured.

Concentrates of soluble whey protein are known in themselves, for example, from the commonly owned U.S. Pat. No. 3,930,039 which involves ultrafiltration. Other methods for preparing whey protein concentrates rely on electrodialysis or molecular sieves. Such concentrates may also be prepared from whey by first removing the milk sugar, thereafter the inorganic ions by ion exchangers or by electrodialysis, and ultimately a portion of the water.

Whey protein concentrate, in the method of this invention, may be dispersed in unripened cheese as a solid powder or as a mixture with an aqueous medium having the consistency and appearance of a viscous solution. Such a fluid mixture may be prepared by combining the protein powder with water, or it may be obtained directly by any one of the methods mentioned above.

When the whey protein concentrate is employed in the method of the invention as a fluid capable of being pumped, separation of the fluid from the curds of the unripened cheese must be avoided because whey protein would be lost thereby. Phase separation can generally be avoided by maintaining a relatively high viscosity. It has been found that a fluid whey protein concentrate which would normally tend to separate from the curd because of a relatively low concentration of solids and correspondingly low viscosity can be stabilized by heating it to an elevated temperature until an adequate increase in viscosity occurs. The pH value of the concentrate during heating should be lower than its isoelectric point, but not lower than 2.5. The preferred pH range is between 2.7 and 3.7. Suitable methods of pH adjustment have been described in the abovementioned patent, but also other known methods are suitable.

The time required for achieving the desired increase in viscosity is usually between 2 minutes and 20 minutes and depends on the temperature. The temperature should be above 65° C., temperatures of 80° to 95° C. being preferred. The treatment is beneficial, for example, for whey protein concentrates containing 15%–22% of which 75% is protein or for whey protein concentrates containing 16%–24% solids of which 60% is protein, all percentage values in this specification and the appended claims being by weight unless stated otherwise.

The concentrate whose viscosity was increased by the heat treatment may be dispersed in unripened cheese without further preparatory treatment, or it may be adjusted to a higher pH, such as 3.5–5.5, before being mixed with the cheese. Preferred neutralizing agents are the salts of weak acids normally present in milk with anions also normally found in milk and include the citrates of alkali metals and alkaline earth metals, as well as neutral whey or whey concentrate. Best cheese compositions are generally obtained if the thermally treated whey protein concentrate is adjusted to a pH value of 3.5–4.5 at which it shows a distinct maximum in viscosity. This maximum viscosity can be achieved either by adjusting the pH to a value between approximately 3.5 and the isoelectric point prior to heating, or by adjusting to a lower pH prior to heating, as mentioned above, and then adjusting to a pH between 3.5 and 4.5.

Typically, a whey protein concentrate containing 15% solids and having a viscosity of about 100 centipoises at 20° C. may be given a viscosity of more than 1000 centipoises at 20° C. by a one-minute heat treatment at 97° C. and pH 3 followed by pH adjustment to 3.7. Surprisingly, no coagulation occurs during this treatment.

While it is important that most of the whey protein, preferably ⅔ or more, which is present in the concentrate be soluble in water prior to heating in an acidic medium, the solubility of the whey protein after this treatment is less critical.

Whey protein concentrate in the form of a dry powder is conveniently stored. In a preferred embodiment of the invention, the powder is dispersed in water, and the viscosity of the resulting mixture is raised by heating at a pH below the isoelectric point of the whey protein as described above. The fluid concentrate so obtained has the approximate consistency of a custard and often is thixotropic. When it is dispersed in unripened cheese, there is obtained a composition free from ingredients which would not be present in whole milk. No synthetic or other extraneous stabilizers are present, and none are needed.

It is preferred that the whey protein concentrate have a solids content approximately equal to that of the unripened cheese. This is not usually possible without the acidic thermal pre-treatment of the concentrate. Skim milk curds, for example, have a normal solids content of 18%. A whey protein concentrate of the same solids content cannot be used to best advantage without the pre-treatment. An ordinary whey protein concentrate containing 18% solids can be dispersed in the curds, but the mixture would soon release a thin liquid and may not be salable. When the same concentrate is heated to increase its viscosity, as described above, the cheese composition obtained by dispersing the concentrate in the unripened cheese is stable in storage and shows less tendency to spoil than the unmixed unripened cheese.

The ratio of casein to whey protein in whole cow's milk is approximately 6:1. The same ratio is easily established in an unripened cheese composition according to the invention. The solids in skim milk curds, for example, contain 75% casein. A corresponding whey protein concentration of 75% may be achieved in the solids of a whey protein concentrate. The two components thus need be mixed only in the ratio of their solids contents. Obviously, an unripened cheese composition containing whey protein in a higher ratio relative to the casein present may be prepared without difficulty.

The method of the invention does not require any changes in the conventional production of the unripened cheese, yet permits the making of a cheese composition having virtually any desired content of whey protein and a correspondingly enhanced nutritive value. The cheese compositions of the invention are generally preferred to the unripened cheese base because of superior taste and consistency. A low-fat cheese composition of the invention has the taste and texture of an unripened cheese much higher in fat content. In organoleptic tests, a cheese composition prepared by the method of the invention and containing 0–2% fat, based on total solids, was considered the equivalent of a conventional unripened cheese containing 10% to 40% fat. The compositions of the invention can be prepared from dry whey protein concentrate stored in the form of powder over extended periods without impairing the taste of the composition.

The following Examples are further illustrative of this invention.

EXAMPLE 1

A spray-dried whey protein concentrate was prepared by ultrafiltration as described in the afore-mentioned patent to contain approximately 1–3% water, 4–6% fat, 70–80% protein, 5–15% lactose, and 2.5% inorganic matter after adjustment to pH 2.7–3.7. More than 90% of the powder dissolved in water.

0.9 kg Whey protein powder was dispersed in 8.2 kg water, and the fluid mixture was found to have a pH value of 3.5. It was held at 95° C., cooled below 60° C., and combined with 0.9 kg of a similarly produced whey protein powder having a pH of 6.2–6.7. The mixture so prepared was sterilized at 70° C. for two minutes and had then a pH of 4.9.

1.75 kg of this material was mixed with 10 kg skim milk curds containing 18% solids by stirring at 1500 r.p.m. for 30 seconds. The product so obtained had a pH value of 4.65–4.50 and the taste and consistency of curds prepared from milk enriched with cream, similar to cream cheese. It was very different from the skim milk curds employed which had a somewhat grainy texture reminiscent of straw in that they gave a gentle scratching sensation in the throat when swallowed. These curds which were employed throughout the following Examples had a pH of 4.6.

EXAMPLE 2

In a procedure otherwise identical with that of Example 1, the amount of concentrate powder subjected to thermal treatment was increased to 1.35 kg, while the neutral whey protein powder was reduced to 0.45 kg. The period of heat treatment was shortened to ten minutes. The whey protein concentrate had a pH value of 4.2 prior to mixing with curds, and the cheese composition ultimately produced had a pH of 4.55–4.45. It was somewhat firmer than the product made in Example 1, but was not significantly different in taste.

EXAMPLE 3

1.8 kg Spray-dried whey protein concentrate of the composition indicated in Example 1 and having a pH of 3.5 was dispersed in 8.2 kg water, and the mixture was kept at 90° C. for 5 minutes. It was then dispersed in 10 kg skim milk curds as in Example 1 to produce a cheese composition having the same consistency or texture as the product of Example 2, but a slightly more acidic taste at pH 4.45.

EXAMPLE 4

A whey protein powder nominally containing 1–3% water, 4–6% fat, 55–65% protein, 20–30% lactose, 3–5% mineral matter, having a pH of 2.7–3.7 and a water solubility greater than 90%, was mixed with water in a ratio of 1.8 kg to 8.2 kg. The mixture, which had a pH of 3.4, was held at 80° C. for two minutes.

The thickened, fluid whey concentrate so prepared was mixed with 10 kg skim milk curds in an amount of 2 kg as in the preceding Examples, and a smooth cheese composition of excellent taste was obtained.

When only 1.0 kg of the same whey protein powder was dispersed in 8.2 kg water and subjected to heat treatment at 85° C. for 5 minutes, and further mixed with 0.8 kg whey protein powder of pH 5.9 which differed from the above composition by a correspondingly higher content of mineral matter (5-8%), a whey protein concentrate of lower viscosity having a pH value of 4.5 was obtained. Yet, it yielded a mild and smooth, stable cheese composition when combined with skim milk curds in the manner described above.

EXAMPLE 5

1.3 kg Whey protein powder of the composition given in Example 1 (pH 3.4) was dispersed in 8.7 kg whey of pH 4.5, and the mixture was held at 90° C. for 5 minutes, whereby a concentrate of pH 3.95 was obtained, but was grainy and unsuited for mixing with unripened cheese to the excessively high pH of the mixture subjected to the heat treatment.

When the same amount of the whey protein powder described in Example 1 (pH 2.5) was dispersed in the whey in the same ratio, and the mixture (pH 3.2) was held at 97° C. for two minutes, there was obtained a smooth, very viscous fluid which was dispersed in skim milk curds in a ratio of 2 kg/10 kg as in Example 4 to prepare a cheese composition which was smooth, aromatic, and slightly acidic (pH 4.45).

EXAMPLE 6

The whey protein powder of pH 3.4 described in Example 4 was dispersed in water in a ratio of 1.2 kg to 8.2 kg, and the fluid mixture was held at 90° C. for four minutes. It was thereafter mixed with 0.6 kg of the more neutral whey powder described in Example 4 (pH 5.9). The mixture then had a pH of 4.25 and was just sufficiently fluid to be pumped. It was mixed with skim milk curds as in Example 4 and a smooth cheese composition having a somewhat bland taste was obtained.

When a batch of whey protein concentrate prepared in the same manner was mixed with skim milk curds in a ratio of 10 kg to 100 kg by means of a continuously operating pump, the resulting cheese composition had a pH of 4.5 and was smooth, somewhat soft, but of pleasant, cream-like taste.

EXAMPLE 7

1.5 kg Whey protein powder of the composition given in Example 1 and having a pH of 3.6 was dispersed in 11.3 kg water, and the mixture was heat-treated at a temperature gradually increasing from 60° to 90° C. in 20 minutes. Thereafter, 1.2 kg of the same powder was mixed in, and a very viscous material was obtained.

It was mixed with skim milk curds in a ratio of 25 kg to 150 kg for 7 minutes by means of a pump. The cheese composition so prepared had a pH of 4.5, a smooth, somewhat fluid texture, and a pure, acidic taste.

EXAMPLE 8

10 kg Whey protein powder as in Example 4 (pH 3.4) was cobmined with 55 kg water, and the mixture was held at 92° C. for five minutes, whereupon it was further mixed with 4.2 kg whey protein powder of similar composition, but pH 5.9. A creamy product having a pH of 4.0 was obtained.

100 kg Skim milk curds were continuously mixed with 20 kg of the product by means of a pump and a pleasantly smooth cheese composition of creamy taste and pH 4.5 was formed.

EXAMPLE 9

2.5 kg Whey protein powder of a composition as in Example 4, but having a pH of 3.6, was dispersed in 7.5 kg water, and a smooth, somewhat viscous whey protein concentrate was obtained. It was dispersed in skim milk curds at a ratio of 2 kg to 10 kg by stirring as in Example 1. The cheese composition so prepared had a pH of 4.45 and was of smooth texture and pleasant, cream-like taste.

A closely similar cheese composition was obtained in an otherwise identical procedure starting with the whey protein powder of Example 1 at pH 3.6.

EXAMPLE 10

Four batches of the whey protein powder described in Example 4 (pH 3.4) were dispersed in water in a ratio of 1.35 kg to 6.5 kg, and the four mixtures were adjusted to respective pH values of 2.7, 3.0, 3.3, and 3.7. Each batch was held at 95° C. for five minutes, cooled to 55° C., mixed with 0.45 kg of otherwise similar whey protein powder of pH 6.5, and the concentrates so obtained, which were viscous, but capable of being pumped, had pH values of 3.73, 3.85, 4.00, and 4.30 respectively. They were mixed with skim milk curds at a weight ratio of 1:5 to produce four equally acceptable cheese compositions varying in pH value from 4.40 to 4.45.

EXAMPLE 11

300 g Whey protein powder of the composition given in Example 4 and having a pH of 3.7 was stirred into water to produce a mixture containing 17% solids which was then held at 90° C. for two minutes. The fluid so obtained had a cream-like consistency, and its pH value was adjusted to 4.0 by the addition of 3.8 g trisodium citrate. This concentrate was dispersed in skim milk curds as described in the preceding examples to yield cheese compositions of excellent taste and texture.

Analogous results were achieved when the aqueous dispersion of the whey solids powder was adjusted to pH 3.2 prior to heating and to pH 4.0 by means of 10 g sodium citrate after heating and cooling.

EXAMPLE 12

1000 kg Skim milk was curdled as is conventional in the making of cottage cheese. Instead of the cream normally employed in preparing creamed cottage cheese, 40 kg of a 20% whey protein concentrate, prepared as in Example 6, was intimately mixed with the curds. The cheese composition so obtained was hardly distinguishable from creamed cottage cheese prepared by good, conventional practice.

When skim milk curds described in the preceding Examples were replaced by curds containing substantial amounts of butter fat derived from the whole milk from which the curds were precipitated or otherwise mixed with the casein, correspondingly enriched unripened cheese compositions were obtained and were of pleasing taste and textures. The effects of the whey protein concentrates, however, are demonstrated most strikingly by the improvement which they contribute to a low-fat composition.

It should be understood, therefore, that the foregoing disclosure relates only to preferred embodiments of the invention, and that it is intended to cover all changes and modifications of the Examples of the invention herein chosen for the purpose of the disclosure which do not depart from the spirit and scope of the invention set forth in the appended claims.

What is claimed is:

1. A method of making an unripened cheese which comprises: (a) adjusting a fluid, water-bearing concentrate of water-soluble whey protein to a pH value between 2.5 and 3.7, said value being below the isoelectric point of said whey protein; (b) heating the adjusted concentrate to an elevated temperature for a period sufficient to increase the viscosity thereof; and (c) dispersing the fluid concentrate of increased viscosity in unripened cheese.

2. A method as set forth in claim 1, wherein said temperature is above 65° C.

3. A method as set forth in claim 2, wherein the solids content of said fluid is approximately equal to the solids content of said unripened cheese.

4. A method as set forth in claim 2, wherein said temperature is 80° to 95° C.

5. A method as set forth in claim 4, wherein said concentrate of increased viscosity is adjusted to a pH value of 3.5 to 5.5 before being dispersed in said cheese.

6. A method as set forth in claim 5, wherein said concentrate is prepared, prior to said adjusting, by ultrafiltration of whey.

7. A method as set forth in claim 6, wherein said whey, prior to said ultrafiltration, is adjusted to a pH value lower than the isoelectric point of said whey.

* * * * *